(12) United States Patent
Okuhata et al.

(10) Patent No.: US 6,749,487 B2
(45) Date of Patent: Jun. 15, 2004

(54) METHOD OF POLISHING GLASS SUBSTRATE FOR INFORMATION RECORDING MEDIA, AND GLASS SUBSTRATE FOR INFORMATION RECORDING MEDIA

(75) Inventors: Koji Okuhata, Yokkaichi (JP); Hiromi Nakano, Yokkaichi (JP); Yoichiro Shimizu, Tsukuba (JP)

(73) Assignee: Hoya Corporation, Tokyo (JP)

(*) Notice: Subject to any disclaimer, the term of this patent is extended or adjusted under 35 U.S.C. 154(b) by 38 days.

(21) Appl. No.: 10/228,033

(22) Filed: Aug. 26, 2002

(65) Prior Publication Data

US 2003/0162482 A1 Aug. 28, 2003

(30) Foreign Application Priority Data

Aug. 27, 2001 (JP) ........................................ 2001-256141
Aug. 20, 2002 (JP) ........................................ 2002-239168

(51) Int. Cl.$^7$ .............................................. B24B 1/00
(52) U.S. Cl. ........................................ 451/41; 451/57
(58) Field of Search ............................ 451/41, 60, 57, 451/5; 65/61, 181

(56) References Cited

U.S. PATENT DOCUMENTS 6,371,834 B1 * 4/2002 Fujimura et al. ............. 451/41
6,530,825 B2 * 3/2003 Fujimura et al. ............. 451/41
2002/0173222 A1 * 11/2002 Benning et al. ............... 451/5

* cited by examiner

Primary Examiner—Dung Van Nguyen
(74) Attorney, Agent, or Firm—Frishauf, Holtz, Goodman & Chick, P.C.

(57) ABSTRACT

There is provided a method of polishing a glass substrate for information recording media which enables polishing to be carried out such that the product quality is improved, without the productivity dropping, and without the processing cost increasing. A precision polishing step has a first polishing step and a second polishing step carried out in this order, in which, after carrying out rough polishing on major surfaces of a glass substrate, precision polishing is carried out on the major surfaces by feeding abrasive grains onto the major surfaces, pushing polishing members against the major surfaces, and rotating the major surfaces and the polishing members relative to one another. At least one of the first polishing step and the second polishing step has a preceding polishing step and a succeeding polishing step carried out in this order. The mean grain diameter of the abrasive grains in the succeeding polishing step is not more than in the preceding polishing step, and pressure at which the polishing members are pushed against the major surfaces is lower in the succeeding polishing step than in the preceding polishing step.

19 Claims, 8 Drawing Sheets

METHOD OF POLISHING GLASS SUBSTRATE FOR INFORMATION RECORDING MEDIA, AND GLASS SUBSTRATE FOR INFORMATION RECORDING MEDIA

BACKGROUND OF THE INVENTION

1. Field of the Invention

The present invention relates to a method of polishing a glass substrate for information recording media, and a glass substrate for information recording media.

2. Description of the Related Art

Conventionally, glass substrates for information recording media used in hard disk drives (hereinafter referred to as "HDDs") or the like have been manufactured through a series of steps such as the following.

1. Disk processing step in which a glass plate is processed into a donut-shaped glass substrate.

2. Chamfering step in which chamfered surfaces are formed at edge parts at the inner and outer peripheries of the donut-shaped glass substrate.

3. EP (edge polishing) step in which the edge surfaces at the inner and outer peripheries of the glass substrate are polished.

4. Surface polishing step in which the major surfaces of the glass substrate to form recording surfaces are polished.

5. Chemical strengthening step in which sodium ions and potassium ions are introduced into the surfaces of the glass substrate, thus strengthening the glass substrate.

6. Inspection step in which the glass substrate that has been subjected to all of the steps up to the chemical strengthening step is inspected with regard to whether or not certain predetermined criteria are satisfied.

The surface polishing step, which is the fourth step, is comprised of a lapping step for reducing the thickness of the glass substrate to a certain predetermined value, and a precision polishing step for giving the major surfaces of the glass substrate a precision finish.

In the lapping step, rough grinding is carried out using abrasive grains of alumina or the like until the thickness of the glass substrate becomes the predetermined value. The precision polishing step following the lapping step is comprised of a first polishing step and a second polishing step. In the first polishing step, the major surfaces of the glass substrate are polished using abrasive grains of cerium oxide or the like, to remove minute cracks in the major surfaces that have arisen through the lapping step and to make the major surfaces into mirror surfaces. In the second polishing step, the major surfaces are polished using abrasive grains having a mean grain diameter lower than the mean grain diameter of the abrasive grains used in the first polishing step, thus finishing the major surfaces.

Of these steps in the surface polishing step, the product quality of the glass substrate is affected in particular by the first polishing step and the second polishing step. Here, the product quality of the glass substrate relates to the shape of the edge parts of the glass substrate, the roughness of the surfaces, and the minute waviness of the surfaces.

Figure 6:
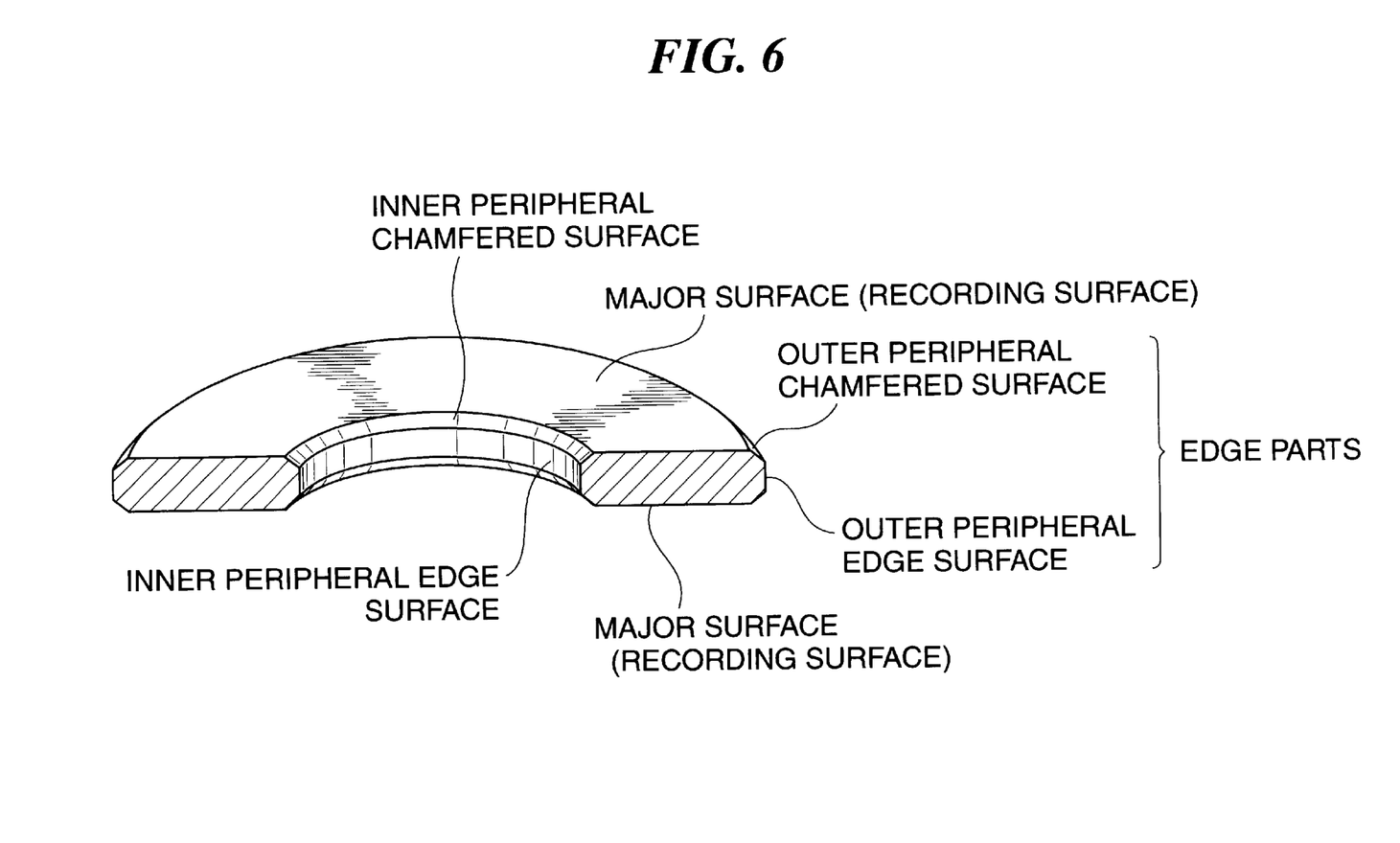
FIG. 6 is a sectional perspective view of a glass substrate.
Figure 7A:
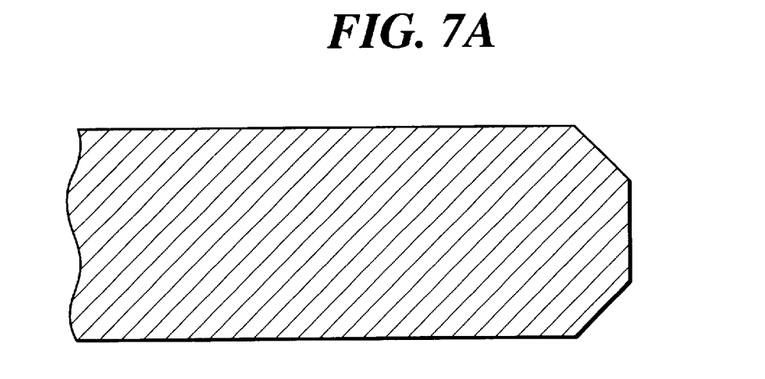
FIG. 7A shows the edge part shape in the case that roll-off has not occurred.
Figure 7B:
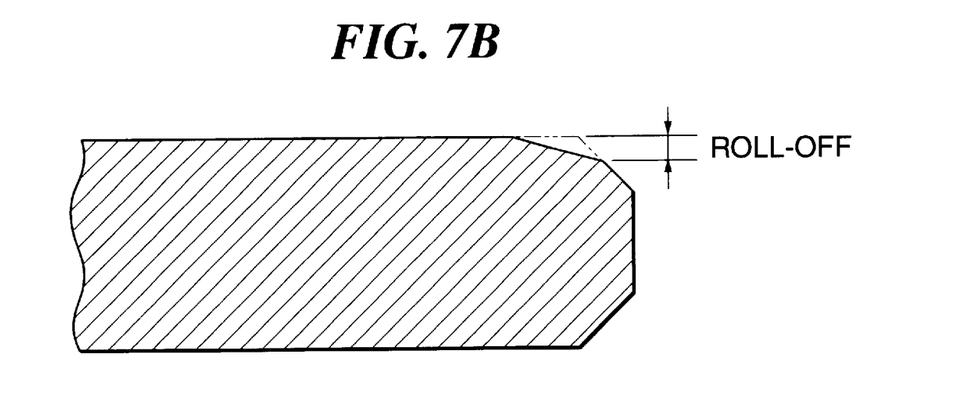
FIG. 7B shows the edge part shape in the case that roll-off has occurred.

FIG. 6 is a sectioned perspective view of a glass substrate. FIGS. 7A and 7B are sectional views showing the cross-sectional shape around an edge part of a glass substrate; FIG. 7A shows the edge part shape in the case that roll-off has not occurred, and FIG. 7B shows the edge part shape in the case that roll-off has occurred.

The product quality with regard to the edge part shape of the glass substrate refers to the extent of so-called "roll-off" in which a peripheral part of the recording surface is shaved off more than a central part thereof (see FIG. 7B). If the extent of roll-off becomes larger, then the difference in the so-called "flying height", which is the distance from the recording surface to the magnetic head, between the central part and the peripheral part of the recording surface becomes larger, and hence the traveling stability of the magnetic head and the accuracy of reading and writing drop, and thus errors occur more frequently. Consequently, the lower the extent of roll-off, the better the product quality.

The product quality with regard to the roughness of the surfaces of the glass substrate refers to the height of projections in particular out of undulations formed on the glass substrate surfaces due to compressive stress generated during the precision polishing step. If the projections are high, then head crashes may occur in which the magnetic head of the HDD collides with the projections, or thermal asperity may occur in which heat generated through such collisions causes malfunctioning in which the magnetic head detects abnormal signals. Consequently, the lower the projections, the better the product quality with regard to the roughness.

The product quality with regard to the minute waviness of the surfaces of the glass substrate refers to the form of appearance of undulations larger than the "roughness".

The following is an explanation of the minute waviness. The "minute waviness" is one aspect of the shape of a substrate surface, and refers to a wave-like shape of wavelength of the order of several hundred microns to millimeters and amplitude of the order of nanometers. Undulations of wavelength shorter than this constitute the "roughness" described above, whereas undulations of wavelength longer than this come under "flatness". There are no precise criteria for classifying into "roughness", "minute waviness" and "flatness". On an actual glass substrate surface, undulations having a wavelength and an amplitude both of the order of nanometers (hereinafter referred to as "ultra-small undulations") are present in random fashion.

The form of appearance of the ultra-small undulations as captured at a span of the order of nanometers is the "roughness". Within the roughness, the form of appearance of the ultra-small undulations is random, but if one looks with a relatively long span, then a regularity to the wavelength can be seen. This regularity of the wavelength in the form of appearance of the ultra-small undulations corresponds to the "minute waviness". The minute waviness can be measured using an Optiflat (product name; made by Phase Shift Technology) optical measuring apparatus. To increase the recording density of a magnetic recording medium, it is necessary to reduce the flying height, and hence it is necessary to make the minute waviness small. Consequently, the smaller the minute waviness, the better the product quality.

In recent years, with increases in the recording density of magnetic recording media, demands on the product quality as described above of glass substrates have become increasingly strict.

Figure 8:
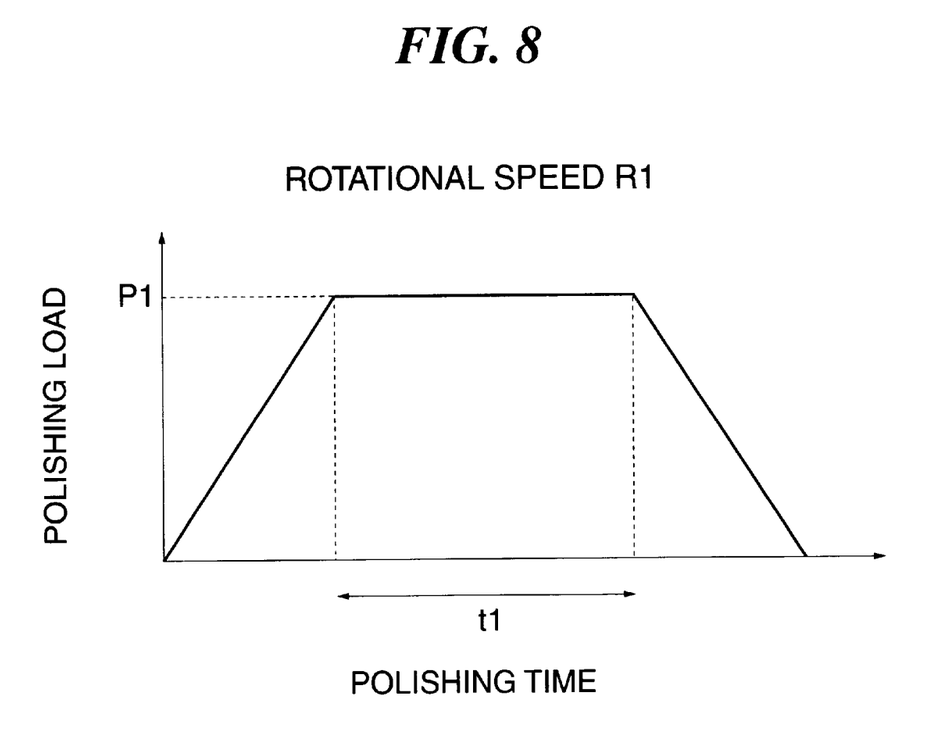
FIG. 8 is a graph showing the polishing load and rotational speed in a precision polishing step according to prior art.

Conventionally, as shown in FIG. 8, in the precision polishing step, polishing has been carried out for a time period t1, by controlling the polishing load P1 applied to the glass substrate and the rotational speed R1 (the number of revolutions per unit time) of the plates on which the polishing members that polish the glass substrate are mounted. To meet the required product quality as described above, the polishing has been carried out with the polishing load P1 reduced and the rotational speed R1 of the plates reduced.

However, with such a glass substrate polishing method, there is a problem that the polishing rate (the polishing amount per unit time) drops, and hence the time t1 required for the precision polishing step becomes long, and thus the productivity becomes poor.

SUMMARY OF THE INVENTION

It is an object of the present invention to provide a method of polishing a glass substrate for information recording media, and a glass substrate for information recording media, which enable polishing to be carried out such that the product quality is improved, without the productivity dropping, and without the processing cost increasing.

To attain the above object, the present invention provides a method of polishing a glass substrate for information recording media, comprising a precision polishing step having a first polishing step and a second polishing step carried out in this order, in which, after carrying out rough polishing on major surfaces of a glass substrate, precision polishing is carried out on the major surfaces by feeding abrasive grains onto the major surfaces, pushing polishing members against the major surfaces, and rotating the major surfaces and the polishing members relative to one another, wherein at least one of the first polishing step and the second polishing step has a preceding polishing step and a succeeding polishing step carried out in this order, and a mean grain diameter of the abrasive grains in the succeeding polishing step is not more than in the preceding polishing step, and a pressure at which the polishing members are pushed against the major surfaces is lower in the succeeding polishing step than in the preceding polishing step.

According to the method of polishing a glass substrate for information recording media of the present invention, the precision polishing step has a first polishing step and a second polishing step carried out in this order, and at least one of the first and second polishing steps has a preceding polishing step and a succeeding polishing step carried out in this order, wherein the mean grain diameter of the abrasive grains in the succeeding polishing step is not more than in the preceding polishing step, and the pressure at which the polishing members are pushed against the major surfaces is lower in the succeeding polishing step than in the preceding polishing step. As a result, the major surfaces of the glass substrate can be polished rapidly until the desired product quality is nearly reached through the preceding polishing step, and then the major surfaces can be finished to a state in which the desired product quality is satisfied through the succeeding polishing step. The polishing can thus be carried out such that the product quality of the glass substrate for information recording media is improved, without the productivity dropping, and without the processing cost increasing.

In a first preferred form of the present invention, the second polishing step has a preceding polishing step and a succeeding polishing step carried out in this order, and a mean grain diameter of the abrasive grains in the succeeding polishing step is not more than in the preceding polishing step, and a pressure at which the polishing members are pushed against the major surfaces is lower in the succeeding polishing step than in the preceding polishing step.

Moreover, it is preferable that the succeeding polishing step has a plurality of steps each having a different combination of the mean grain diameter of the abrasive grains and the pressure at which the polishing members are pushed against the major surfaces. As a result, the optimum number of steps and the optimum combinations of the mean grain diameter of the abrasive grains and the pressure can be set in accordance with the material properties and so on of the glass substrate for information recording media. The polishing can thus be carried out in accordance with the material properties and so on of the glass substrate for information recording media, such that the productivity and the product quality are further improved, without the processing cost increasing.

Preferably, the pressure at which the polishing members are pushed against the major surfaces is in a range of 80 to 200 $g/cm^2$ in the first polishing step, in a range of 80 to 150 $g/cm^2$ in the preceding polishing step, and in a range of 30 to 70 $g/cm^2$ in the succeeding polishing step.

In a second preferred form of the present invention, the precision polishing step has a first polishing step and a second polishing step carried out in this order, and the first polishing step has a preceding polishing step and a succeeding polishing step carried out in this order, wherein the mean grain diameter of the abrasive grains in the succeeding polishing step is not more than in the preceding polishing step, and the pressure at which the polishing members are pushed against the major surfaces is lower in the succeeding polishing step than in the preceding polishing step.

In the second preferred form, it is preferable that the succeeding polishing step has a plurality of steps each having a different combination of the mean grain diameter of the abrasive grains and the pressure at which the polishing members are pushed against the major surfaces.

In the second preferred form, it as preferable that the pressure at which the polishing members are pushed against the major surfaces is in a range of 90 to 200 $g/cm^2$ in the preceding polishing step, in a range of 30 to 80 $g/cm^2$ in the succeeding polishing step, and in a range of 30 to 80 $g/cm^2$ in the second polishing step.

In a third preferred form of the present invention, the precision polishing step has a first polishing step and a second polishing step carried out in this order, the first polishing step has a preceding polishing step and a succeeding polishing step carried out in this order, wherein the mean grain diameter of the abrasive grains in the succeeding polishing step is not more than in the preceding polishing step, and the pressure at which the polishing members are pushed against the major surfaces is lower in the succeeding polishing step than in the preceding polishing step, and the second polishing step has a preceding polishing step and a succeeding polishing step carried out in this order, wherein the mean grain diameter of the abrasive grains in the succeeding polishing step is not more than in the preceding polishing step, and the pressure at which the polishing members are pushed against the major surfaces is lower in the succeeding polishing step than in the preceding polishing step.

In the third preferred form, it is preferable that the succeeding polishing step of the first polishing step has a plurality of steps each having a different combination of the mean grain diameter of the abrasive grains and the pressure at which the polishing members are pushed against the major surfaces, and the succeeding polishing step of the second polishing step has a plurality of steps each having a different combination of the mean grain diameter of the abrasive grains and the pressure at which the polishing members are pushed against the major surfaces.

In the third preferred form, it is preferable that the pressure at which the polishing members are pushed against the major surfaces is in a range of 90 to 200 $g/cm^2$ in the preceding polishing step of the first polishing step, in a range of 30 to 80 g/cm² in the succeeding polishing step of the first polishing step, in a range of 80 to 150 g/cm² in the preceding polishing step of the second polishing step, and in a range of 30 to 70 g/cm² in the succeeding polishing step of the second polishing step.

It is preferable that the polishing members are hard urethane pads in the first polishing step, and soft suede pads in the second polishing step.

It is also preferable that the abrasive grains in the first polishing step are cerium oxide abrasive grains having a mean grain diameter in a range of 1.1 to 1.5 μm, and the abrasive grains in the second polishing step are cerium oxide abrasive grains having a mean grain diameter of not more than 1 μm.

It is preferable that a polishing amount of the glass substrate in the second polishing step is not less than 3 μm.

It is preferable that a polishing amount of the glass substrate in the first polishing step is not less than 30 μm.

It is preferable that a total polishing amount of the glass substrate through the first polishing step and the second polishing step is in a range of 33 to 100 μm.

To attain the above object, there is also provided a glass substrate for information recording media obtained by polishing using a method of polishing a glass substrate for information recording media according to the present invention, whereby substantially the same results as obtained with the method according to the present invention can be provided.

The above and other objects, features and advantages of the invention will become more apparent from the following detailed description taken in conjunction with the accompanying drawings.

BRIEF DESCRIPTION OF THE DRAWINGS

FIGS. 3A and 3B are graphs showing polishing conditions in a method of polishing a glass substrate for information recording media according to a first embodiment of the present invention; specifically:

FIGS. 4A and 4B are graphs showing polishing conditions in a method of polishing a glass substrate for information recording media according to a second embodiment of the present invention; specifically:

FIGS. 5A and 5B are graphs showing polishing conditions in a method of polishing a glass substrate for information recording media according to a third embodiment of the present invention; specifically:

FIGS. 7A and 7B are sectional views showing the cross-sectional shape around an edge part of a glass substrate; specifically:

DETAILED DESCRIPTION OF THE PREFERRED EMBODIMENTS

The present inventors carried out assiduous studies to attain the object described earlier, and as a result discovered that, after carrying out rough polishing on the major surfaces of a glass substrate, when carrying out precision polishing on the major surfaces by feeding abrasive grains onto the major surfaces, pushing polishing members against the major surfaces, and rotating the major surfaces and the polishing members relative to one another, if the polishing is carried out through a first polishing step and a second polishing step carried out in this order, and moreover at least one of the first polishing step and the second polishing step is divided into a preceding polishing step and a succeeding polishing step carried out in this order, wherein the mean grain diameter of the abrasive grains in the succeeding polishing step is not more than in the preceding polishing step, and the pressure at which the polishing members are pushed against the major surfaces is lower in the succeeding polishing step than in the preceding polishing step, then the polishing can be carried out such that the product quality is improved, without the productivity dropping, and without the processing cost increasing.

The present invention was attained based on the above findings.

A detailed description will now be given of various embodiments of the method of polishing a glass substrate for information recording media according to the present invention, with reference to the drawings.

Figure 1:
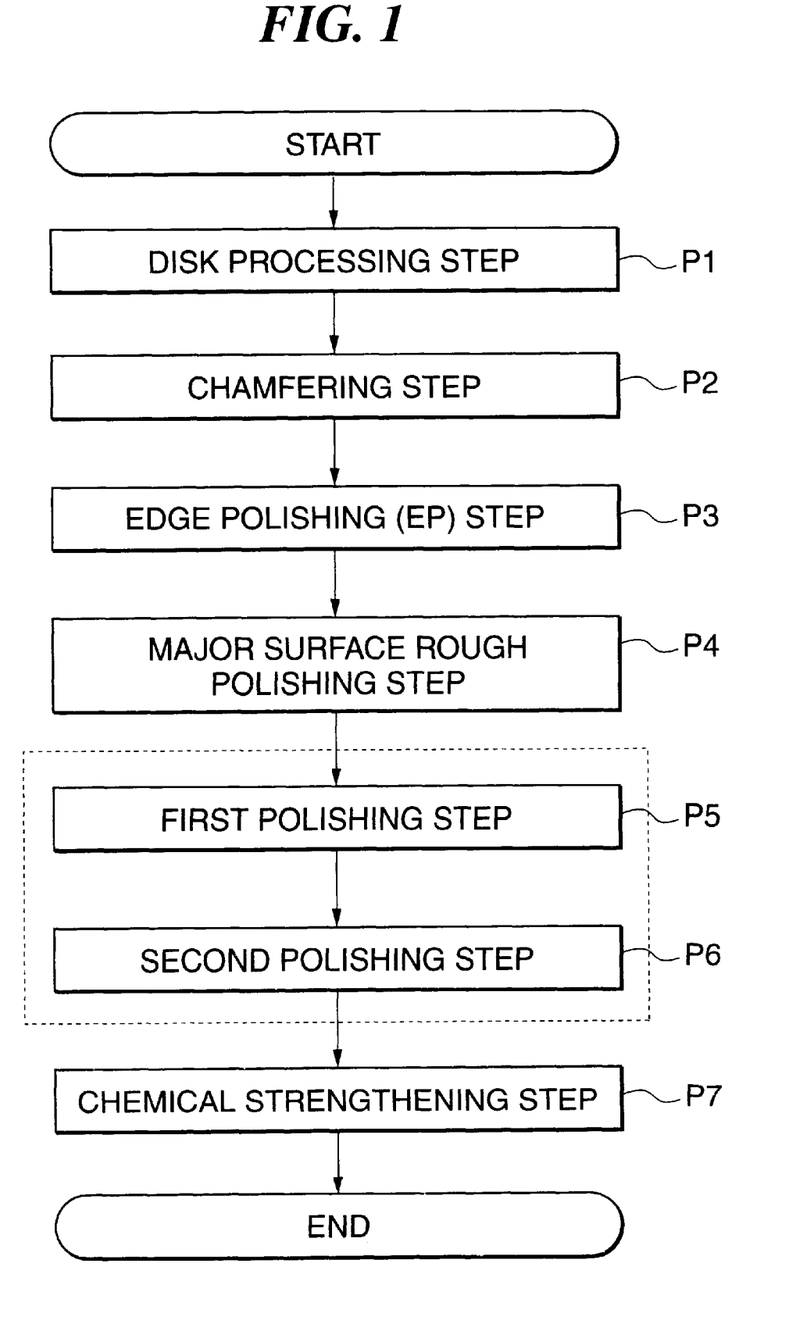
FIG. 1 is a flow chart showing a general manufacturing procedure of a glass substrate for information recording media.

FIG. 1 is a flow chart showing a general manufacturing procedure of a glass substrate for information recording media.

The glass substrate for information recording media is manufactured through a disk processing step P1, a chamfering step P2, an edge polishing (EP) step P3, a major surface rough polishing step P4, a precision polishing step (which is comprised of a first polishing step P5 and then a second polishing step P6), and a chemical strengthening step P7 in this order. Out of these steps, the first polishing step P5 and the second polishing step P6, which are enclosed by dashed lines in FIG. 1, constitute the precision polishing step for polishing the major surfaces to a precision finish. The polishing method in this precision polishing step is the polishing method invented by the present inventors.

Figure 2:
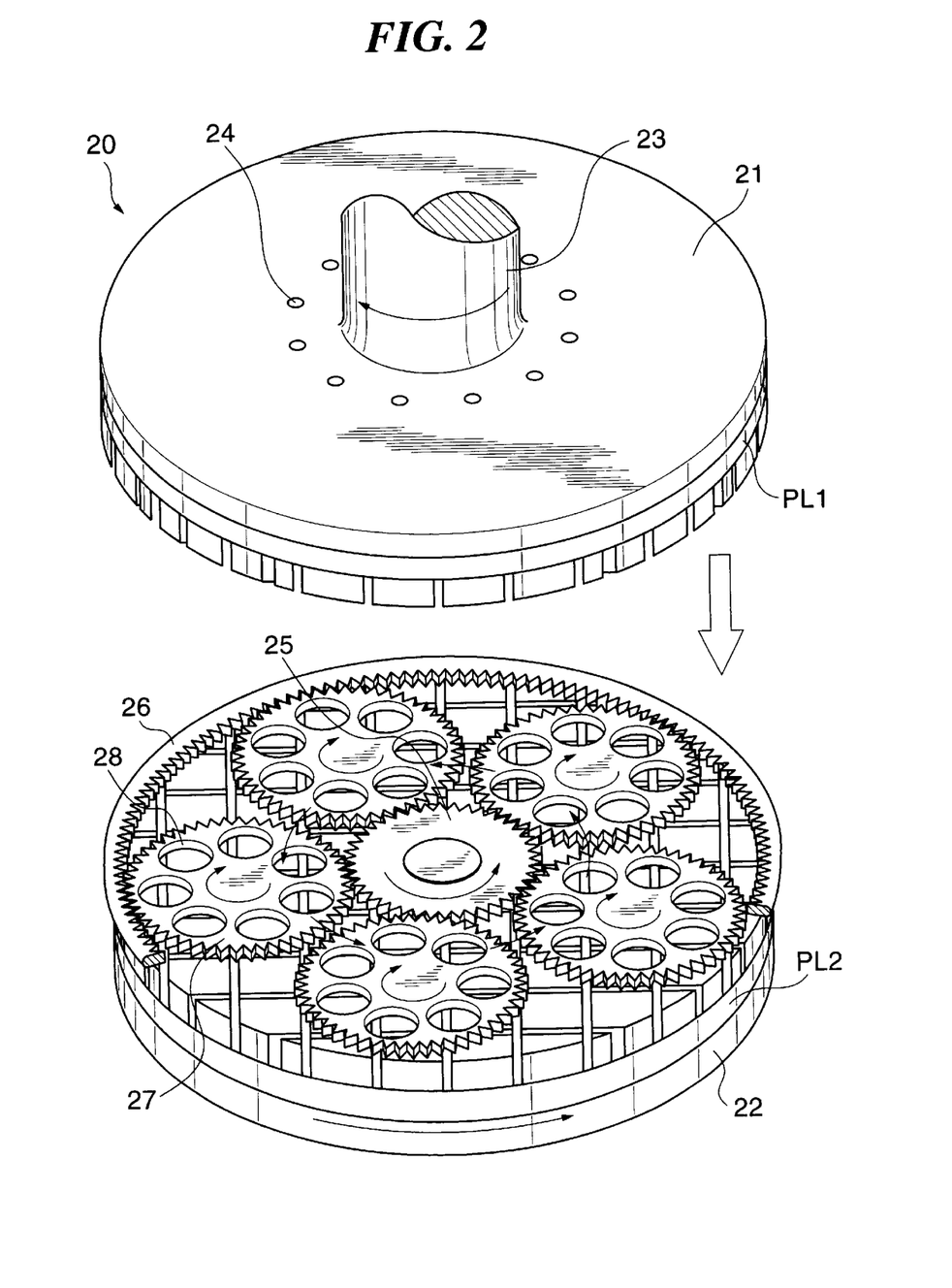
FIG. 2 is an exploded perspective view of essential parts of a polishing apparatus used in the method of polishing a glass substrate for information recording media according to each embodiment of the present invention.

FIG. 2 is an exploded perspective view of essential parts of a polishing apparatus used in the method of polishing a glass substrate for information recording media according to each embodiment of the present invention.

The polishing apparatus 20 is comprised of a horizontal upper plate 21 made of cast iron, and a horizontal lower plate 22 also made of cast iron. A polishing pad (polishing member) PL1 is provided on the upper plate 21, and grooves of width 2.5 mm are cut into a polishing surface of the polishing pad PL1 in a square grid shape at a pitch of 20 mm. A polishing pad (polishing member) PL2 is provided on the lower plate 22, and grooves of width 2.5 mm are cut into a polishing surface of the polishing pad PL2 in a square grid shape at a pitch of 30 mm. The upper plate 21 has a rotating supporting shaft 23, and sixteen supply ports 24 for a $CeO_2$ abrasive grain slurry are formed in the upper plate 21 around the rotating supporting shaft 23 at equal angular intervals.

The upper plate 21 is rotated clockwise as viewed from above (hereinafter "clockwise" and "counterclockwise" always refer to the direction of rotation when viewed from above) at a rotational speed in a range of 16 to 18 rpm, and the lower plate 22 is rotated counterclockwise at a rotational speed in a range of 50 to 55 rpm.

A sun gearwheel 25 is disposed in a central part of the lower plate 22, and an internal gearwheel 26 is disposed at a peripheral part of the lower plate 22. Five carriers 27 each having an epicyclic gearwheel that engages with both the sun gearwheel 25 and the internal gearwheel 26 are disposed on the lower plate 22. Each carrier 27 has formed therein seven holding holes each of which is for holding a glass substrate. In the polishing apparatus 20, when the sun gearwheel 25 is rotated counterclockwise at, for example, a rotational speed in a range of 15 to 22 rpm, and the internal gearwheel 26 is rotated counterclockwise at, for example, a rotational speed in a range of 21 to 29 rpm, then the carriers 27 move over the lower plate 22, revolving counterclockwise around the sun gearwheel 25 at, for example, 50 rpm, while rotating on their own axes clockwise. The carriers 27 are made, for example, of a glass-fiber-containing epoxy resin, and the thickness thereof is less than the final thickness of the glass substrates (e.g. 1 mm), for example 0.2 to 0.6 mm. The carriers 27 may also be made of an aramid-fiber-containing epoxy resin.

Figure 3A:
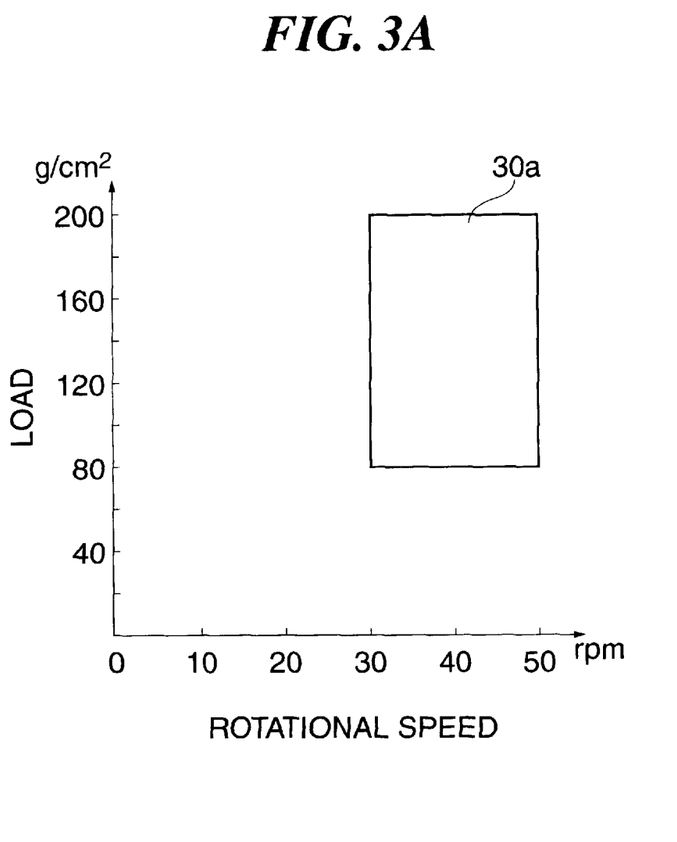
FIG. 3A shows the polishing conditions in a first polishing step.
Figure 3B:
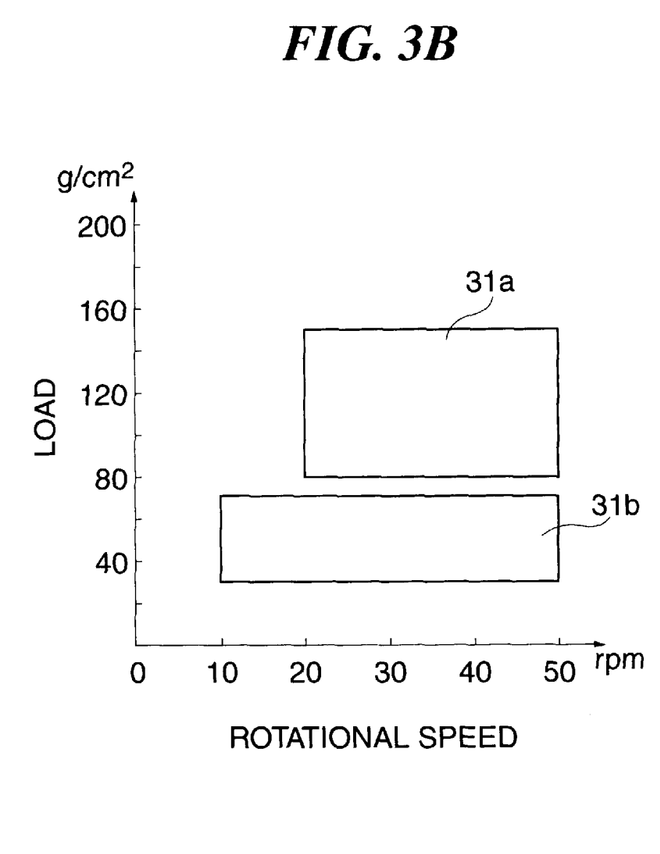
FIG. 3B shows the polishing conditions in a second polishing step.

FIGS. 3A and 3B are graphs showing polishing conditions in a method of polishing a glass substrate for information recording media according to a first embodiment of the present invention; specifically, FIG. 3A shows the polishing conditions in a first polishing step, and FIG. 3B shows the polishing conditions in a second polishing step.

The polishing conditions shown in FIGS. 3A and 3B are the load applied to the major surfaces of the glass substrate by the polishing pads PL1 and PL2 (vertical axis), and the relative rotational speed between the major surfaces of the glass substrate and the polishing pads PL1 and PL2 (horizontal axis).

In the method of polishing a glass substrate for information recording media according to the present embodiment, the first polishing step is carried out under predetermined constant polishing conditions. Specifically, the combination of the load (pressure) applied to the major surfaces of the glass substrate by the polishing pads PL1 and PL2, the relative rotational speed between the major surfaces of the glass substrate and the polishing pads PL1 and PL2, and the mean grain diameter of the abrasive grains is fixed.

As shown by a region 30a in FIG. 3A, in the first polishing step, the range of the load is 80 to 200 $g/cm^2$, and the range of the rotational speed is 30 to 50 rpm.

Next, the second polishing step is constituted from two steps having different polishing conditions to one another. It should be noted, however, that the second polishing step is not limited to being constituted from two steps, but rather may also be constituted from more than two steps.

The second polishing step is constituted from a preceding polishing step, which is carried out after the first polishing step, and a succeeding polishing step, which is carried out after the preceding polishing step. The polishing conditions are different between the preceding polishing step and the succeeding polishing step.

As shown in FIG. 3B, in the preceding polishing step, the range of the load is 80 to 150 $g/cm^2$, and the range of the rotational speed is 20 to 50 rpm (region 31a). On the other hand, in the succeeding polishing step, the range of the load is 30 to 70 $g/cm^2$, and the range of the rotational speed is 10 to 50 rpm (region 31b).

Moreover, the mean grain diameter of the abrasive grains used in the succeeding polishing step is not more than the mean grain diameter of the abrasive grains used in the preceding polishing step.

Figure 4A:
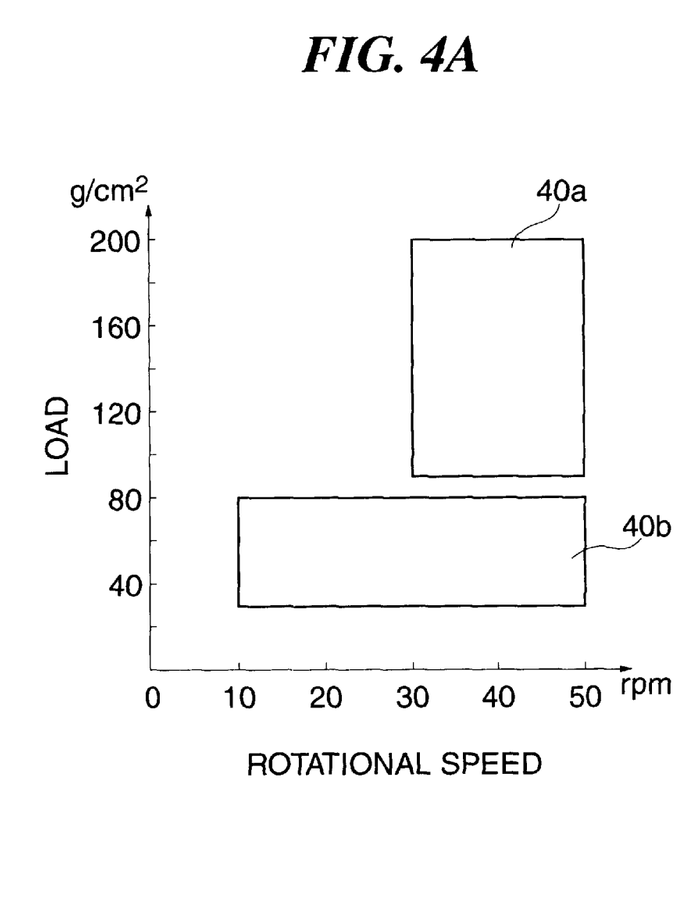
FIG. 4A shows the polishing conditions in a first polishing step.
Figure 4B:
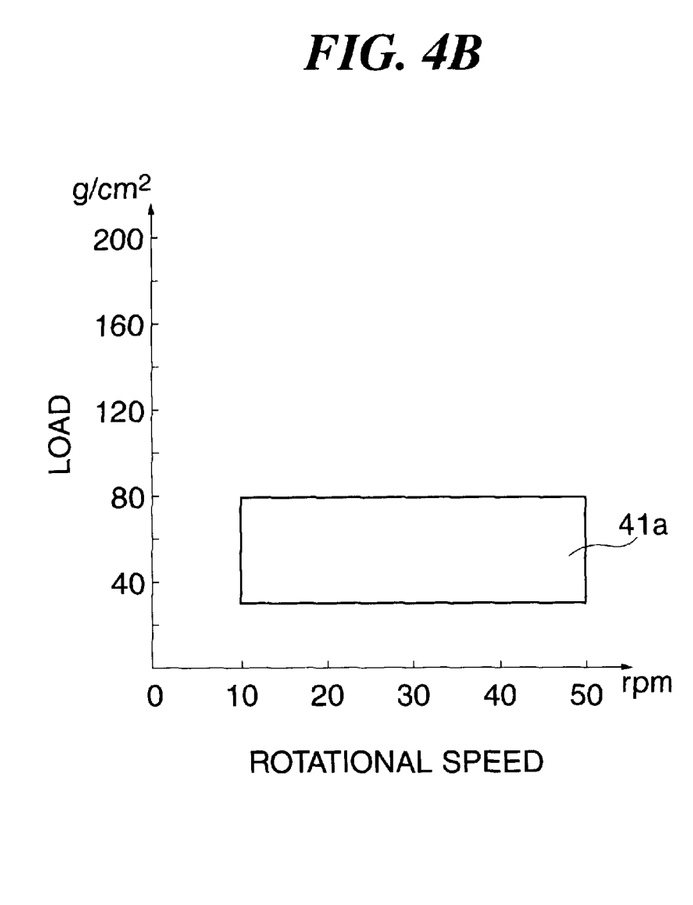
FIG. 4B shows the polishing conditions in a second polishing step.

FIGS. 4A and 4B are graphs showing polishing conditions in a method of polishing a glass substrate for information recording media according to a second embodiment of the present invention; specifically, FIG. 4A shows the polishing conditions in a first polishing step, and FIG. 4B shows the polishing conditions in a second polishing step. The items of the polishing conditions are the same as those shown in FIG. 3.

In the method of polishing a glass substrate for information recording media according to the present embodiment, the first polishing step is constituted from two steps having different polishing conditions to one another, and the second polishing step is carried out under predetermined constant polishing conditions. It should be noted, however, that the first polishing step is not limited to being constituted from two steps, but rather may also be constituted from more than two steps.

The first polishing step is constituted from two steps, namely a preceding polishing step, which is carried out first, and a succeeding polishing step, which is carried out after the preceding polishing step. The polishing conditions are different between the preceding polishing step and the succeeding polishing step.

As shown in FIG. 4A, in the preceding polishing step, the range of the load is 90 to 200 $g/cm^2$, and the range of the rotational speed is 30 to 50 rpm (region 40a). On the other hand, in the succeeding polishing step, the range of the load is 30 to 80 $g/cm^2$, and the range of the rotational speed is 10 to 50 rpm (region 40b).

Moreover, the mean grain diameter of the abrasive grains used in the succeeding polishing step is not more than the mean grain diameter of the abrasive grains used in the preceding polishing step.

In the second polishing step, which follows the first polishing step, the polishing is carried out under predetermined constant polishing conditions. As shown by the region 41a in FIG. 4B, in the second polishing step, the range of the load is 30 to 80 $g/cm^2$, and the range of the rotational speed is 10 to 50 rpm.

Moreover, the mean grain diameter of the abrasive grains used in the second polishing step is not more than the mean grain diameter of the abrasive grains used in the final step of the first polishing step (i.e. the succeeding polishing step).

Figure 5A:
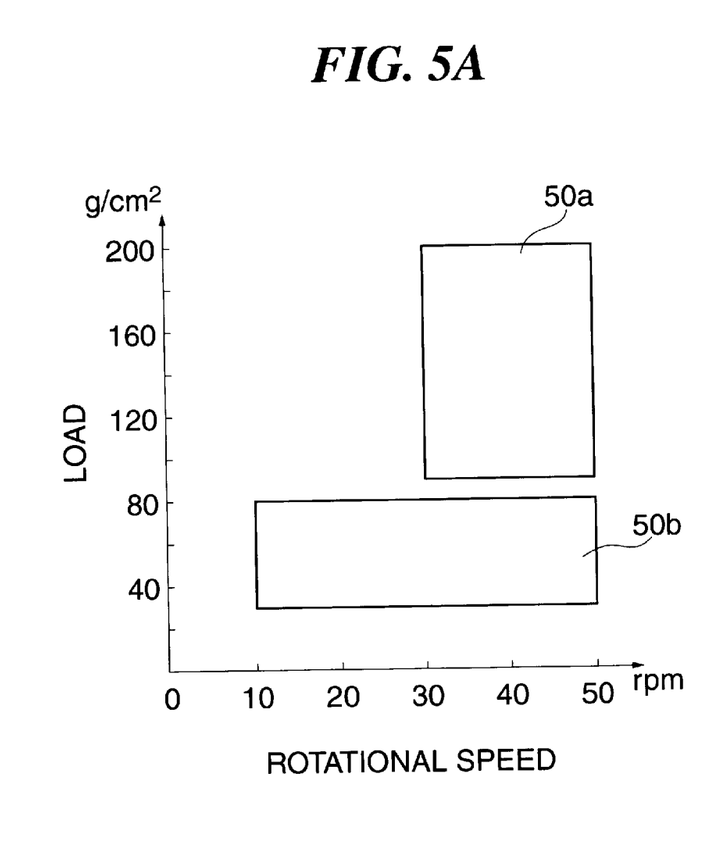
FIG. 5A shows the polishing conditions in a first polishing step.
Figure 5B:
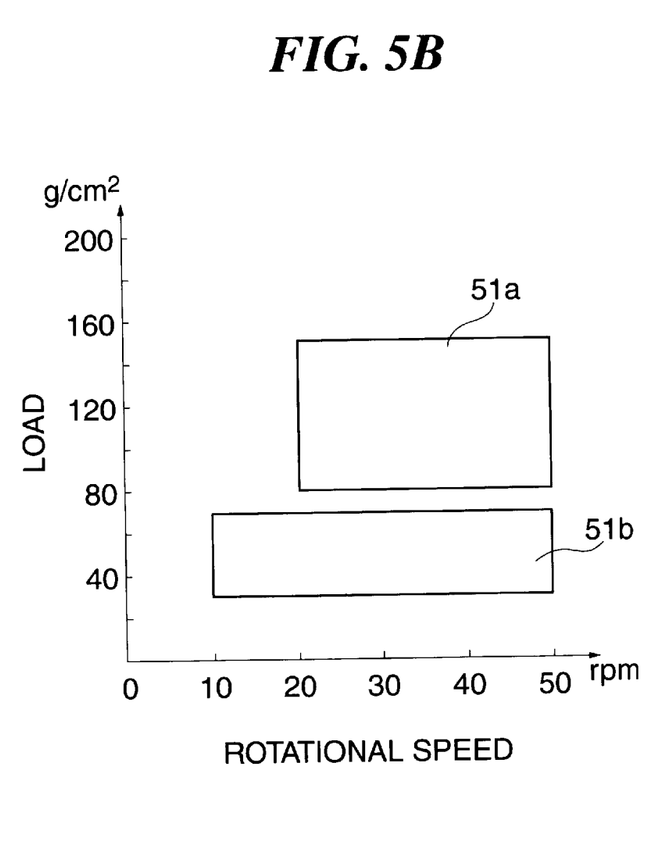
FIG. 5B shows the polishing conditions in a second polishing step.

FIGS. 5A and 5B are graphs showing polishing conditions in a method of polishing a glass substrate for information recording media according to a third embodiment of the present invention; specifically, FIG. 5A shows the polishing conditions in a first polishing step, and FIG. 5B shows the polishing conditions in a second polishing step.

In the method of polishing a glass substrate for information recording media according to the present embodiment, the first polishing step and the second polishing step are both constituted from a plurality of steps having different polishing conditions to one another.

The first polishing step is constituted from two steps, namely a preceding polishing step, which is carried out first, and a succeeding polishing step, which is carried out after the preceding polishing step. The polishing conditions are different between the preceding polishing step and the succeeding polishing step.

As shown in FIG. 5A, in the preceding polishing step, the range of the load is 90 to 200 g/cm$^2$, and the range of the rotational speed is 30 to 50 rpm (region 50a). On the other hand, in the succeeding polishing step, the range of the load is 30 to 80 g/cm$^2$, and the range of the rotational speed is 10 to 50 rpm (region 50b).

Moreover, the mean grain diameter of the abrasive grains used in the succeeding polishing step is not more than the mean grain diameter of the abrasive grains used in the preceding polishing step.

The second polishing step is also constituted from two steps, namely a preceding polishing step, which is carried out after the first polishing step, and a succeeding polishing step, which is carried out after the preceding polishing step. The polishing conditions are different between the preceding polishing step and the succeeding polishing step.

As shown in FIG. 5B, in the preceding polishing step of the second polishing step, the range of the load is 80 to 150 g/cm$^2$, and the range of the rotational speed is 20 to 50 rpm (region 51a). On the other hand, in the succeeding polishing step of the second polishing step, the range of the load is 30 to 70 g/cm$^2$, and the range of the rotational speed is 10 to 50 rpm (region 51b).

Moreover, the mean grain diameter of the abrasive grains used in the preceding polishing step of the second polishing step is not more than the mean grain diameter of the abrasive grains used in the succeeding polishing step of the first polishing step. Furthermore, the mean grain diameter of the abrasive grains used in the succeeding polishing step of the second polishing step is also not more than the mean grain diameter of the abrasive grains used in the preceding polishing step of the second polishing step.

In all of the above described embodiments, it is preferable that the abrasive grains used in the first polishing step are formed of cerium oxide having a mean grain size within a range of 1.1 to 1.5 $\mu$m, and the abrasive grains used in the second polishing step are formed of cerium oxide having a mean grain size of not more than 1 $\mu$m. To shorten the polishing time, it is more preferable that the mean grain size of the abrasive grains used in the second polishing step should be not less than 0.1 $\mu$m, and still more preferably, not less than 0.2 $\mu$m.

The following experiments were carried out to verify the findings of the present invention described earlier.

The polished glass substrates for information recording media (hereinafter referred to as the "glass substrates") had a disk shape of diameter 3.0 inches and thickness 1.1 mm. These glass substrates were made of an aluminosilicate glass having a composition of 66 mol % $SiO_2$, 10 mol % $Al_2O_3$, 7 mol % $Li_2O$, 10 mol % $Na_2O$, 3 mol % MgO, and 4 mol % CaO.

The polishing conditions in the experiments and the results are shown in Table 1.

TABLE 1

| | First Polishing | | | | | | | | Second Polishing | | | |
|---|---|---|---|---|---|---|---|---|---|---|---|---|
| | Main Polishing (High Pressure) | | | | Subsequent Polishing | | | | Preceding Polishing | | | |
| | Pressure P1 | Rotational Speed R1 | Polishing Amount | Time T1 | Pressure P1 | Rotational Speed R1 | Polishing Amount | Time T1 | Pressure P1 | Rotational Speed R1 | Polishing Amount | Time T1 |
| Example | | | | | | | | | | | | |
| 1 | 100 | 40 | 40 | 40 | | | | | 80 | 30 | 7 | 10 |
| 2 | 100 | 40 | 40 | 40 | | | | | 150 | 50 | 7 | 5 |
| 3 | 100 | 40 | 40 | 40 | | | | | 150 | 20 | 7 | 8 |
| 4 | 100 | 40 | 40 | 40 | | | | | 80 | 20 | 7 | 11 |
| 5 | 100 | 40 | 40 | 40 | | | | | 80 | 50 | 7 | 9 |
| 6 | 200 | 50 | 30 | 15 | | | | | 100 | 30 | 7 | 8 |
| 7 | 200 | 30 | 30 | 16 | | | | | 100 | 30 | 7 | 8 |
| 8 | 80 | 50 | 40 | 47 | | | | | 100 | 30 | 7 | 8 |
| 9 | 80 | 30 | 40 | 53 | | | | | 100 | 30 | 7 | 8 |
| 10 | 100 | 40 | 35 | 35 | 50 | 40 | 5 | 10 | | | | |
| 11 | 100 | 40 | 35 | 35 | 50 | 40 | 5 | 10 | | | | |
| 12 | 100 | 40 | 35 | 35 | 50 | 40 | 5 | 10 | | | | |
| 13 | 200 | 50 | 35 | 17 | 30 | 10 | 5 | 25 | | | | |
| 14 | 200 | 50 | 35 | 17 | 80 | 10 | 5 | 10 | | | | |
| 15 | 90 | 30 | 35 | 41 | 30 | 30 | 5 | 16 | | | | |
| 16 | 90 | 50 | 35 | 39 | 80 | 10 | 5 | 10 | | | | |
| 17 | 100 | 40 | 35 | 35 | 50 | 40 | 5 | 10 | 80 | 30 | 7 | 10 |
| 18 | 100 | 40 | 35 | 35 | 50 | 40 | 5 | 10 | 80 | 30 | 7 | 10 |
| Comparative Example | | | | | | | | | | | | |
| 1 | 100 | 40 | 30 | 30 | | | | | 80 | 30 | 8 | 12 |
| 2 | 50 | 40 | 30 | 60 | | | | | 40 | 30 | 8 | 24 |
| 3 | 100 | 40 | 40 | 40 | | | | | 80 | 30 | 10 | 14 |
| 4 | 50 | 40 | 40 | 80 | | | | | 40 | 30 | 10 | 30 |
| 5 | 100 | 40 | 40 | 80 | | | | | 40 | 30 | 10 | 30 |
| 6 | 50 | 40 | 40 | 80 | | | | | 80 | 30 | 10 | 14 |

TABLE 1-continued

| | | Second Polishing Main Polishing (Low Pressure) | | | Product Quality | | | |
|---|---|---|---|---|---|---|---|---|
| | Pressure P1 | Rotational Speed R1 | Polishing Amount | Time T1 | Surface Roughness Ra (nm) | Surface Waviness Wa (nm) | Edge part Shape Roll off (μm) | Polishing Time (min) |
| Example | | | | | | | | |
| 1 | 40 | 30 | 3 | 9 | 0.34 | 0.53 | 0.1 | 59 |
| 2 | 30 | 10 | 3 | 15 | 0.32 | 0.57 | 0.18 | 60 |
| 3 | 30 | 10 | 3 | 15 | 0.32 | 0.55 | 0.18 | 63 |
| 4 | 70 | 50 | 3 | 4 | 0.37 | 0.58 | 0.19 | 55 |
| 5 | 30 | 10 | 3 | 15 | 0.31 | 0.53 | 0.1 | 64 |
| 6 | 40 | 40 | 3 | 9 | 0.33 | 0.55 | 0.15 | 32 |
| 7 | 40 | 40 | 3 | 9 | 0.33 | 0.54 | 0.15 | 33 |
| 8 | 40 | 40 | 3 | 9 | 0.33 | 0.53 | 0.13 | 64 |
| 9 | 40 | 40 | 3 | 9 | 0.32 | 0.53 | 0.12 | 70 |
| 10 | 40 | 30 | 4 | 9 | 0.34 | 0.52 | 0.15 | 54 |
| 11 | 70 | 50 | 4 | 6 | 0.36 | 0.59 | 0.18 | 51 |
| 12 | 30 | 10 | 4 | 20 | 0.32 | 0.52 | 0.14 | 65 |
| 13 | 40 | 30 | 4 | 9 | 0.33 | 0.59 | 0.2 | 51 |
| 14 | 40 | 30 | 4 | 9 | 0.34 | 0.6 | 0.2 | 36 |
| 15 | 40 | 40 | 4 | 9 | 0.33 | 0.52 | 0.15 | 66 |
| 16 | 40 | 40 | 4 | 9 | 0.33 | 0.53 | 0.15 | 58 |
| 17 | 40 | 30 | 4 | 9 | 0.33 | 0.52 | 0.12 | 64 |
| 18 | 40 | 30 | 4 | 9 | 0.32 | 0.51 | 0.1 | 54 |
| Comparative Example | | | | | | | | |
| 1 | | | | | 0.41 | 0.8 | 0.3 | 42 |
| 2 | | | | | 0.34 | 0.53 | 0.1 | 84 |
| 3 | | | | | 0.4 | 0.8 | 0.28 | 54 |
| 4 | | | | | 0.33 | 0.52 | 0.09 | 110 |
| 5 | | | | | 0.34 | 0.52 | 0.15 | 110 |
| 6 | | | | | 0.4 | 0.78 | 0.25 | 94 |

For Examples 1 to 9, the glass substrates were polished using the polishing method according to the first embodiment described above.

1. First polishing (the first polishing step) was carried out using the polishing apparatus shown in FIG. 2, using a polishing slurry obtained by mixing cerium oxide abrasive grains of mean grain diameter approximately 1.5 μm with water. The polishing pads used were hard pads (polyurethane pads made by Speedfam Co., Ltd.; product name MHC15A).

2. Second polishing (the second polishing step) was carried out using the polishing apparatus shown in FIG. 2, using a polishing slurry obtained by mixing cerium oxide abrasive grains of mean grain diameter approximately 0.5 μm with water for both prior polishing (the preceding polishing step) and main polishing (the succeeding polishing step). The polishing pads used were soft pads (suede pads made by Speedfam Co., Ltd.; product name Polytex).

Polishing Conditions During the First Polishing for Examples 1 to 5

| | |
|---|---|
| Polishing pressure P1: | 100 g/cm² |
| Rotational speed R1: | 40 rpm |
| Polishing amount: | 40 μm |
| Time T1: | 40 min |

Polishing Conditions During the Prior Polishing (Preceding Polishing Step) of the Second Polishing for Examples 1 to 5

| | | |
|---|---|---|
| Polishing pressure P1: | Example 1 | 80 g/cm² |
| | Example 2 | 150 g/cm² |
| | Example 3 | 150 g/cm² |
| | Example 4 | 80 g/cm² |
| | Example 5 | 80 g/cm² |
| Rotational speed R1: | Example 1 | 30 rpm |
| | Example 2 | 50 rpm |
| | Example 3 | 20 rpm |
| | Example 4 | 20 rpm |
| | Example 5 | 50 rpm |
| Polishing amount: | 7 μm (for all of Examples 1 to 5) | |
| Time T1: | Example 1 | 10 min |
| | Example 2 | 5 min |
| | Example 3 | 8 min |
| | Example 4 | 11 min |
| | Example 5 | 9 min |

Polishing Conditions During the Main Polishing (Succeeding Polishing Step) of the Second Polishing for Examples 1 to 5

| | | |
|---|---|---|
| Polishing pressure P1: | Example 1 | 40 g/cm² |
| | Example 2 | 30 g/cm² |
| | Example 3 | 30 g/cm² |
| | Example 4 | 70 g/cm² |
| | Example 5 | 30 g/cm² |
| Rotational speed R1: | Example 1 | 30 rpm |
| | Example 2 | 10 rpm |
| | Example 3 | 10 rpm |
| | Example 4 | 50 rpm |
| | Example 5 | 10 rpm |
| Polishing amount: | 3 μm (for all of Examples 1 to 5) | |

-continued

|  |  |  |
|---|---|---|
| Time T1: | Example 1 | 9 min |
|  | Example 2 | 15 min |
|  | Example 3 | 15 min |
|  | Example 4 | 4 min |
|  | Example 5 | 15 min |

As a result of carrying out polishing under the above polishing conditions, the following product qualities were obtained.

|  |  |  |
|---|---|---|
| Surface roughness Ra: | Example 1 | 0.34 nm |
|  | Example 2 | 0.32 nm |
|  | Example 3 | 0.32 nm |
|  | Example 4 | 0.37 nm |
|  | Example 5 | 0.31 nm |

The product quality required with regard to the surface roughness is that the surface roughness Ra be not more than 0.50 nm, and hence Examples 1 to 5 all satisfied the surface roughness product quality.

|  |  |  |
|---|---|---|
| Surface waviness Wa: | Example 1 | 0.53 nm |
|  | Example 2 | 0.57 nm |
|  | Example 3 | 0.55 nm |
|  | Example 4 | 0.58 nm |
|  | Example 5 | 0.53 nm |

The product quality required with regard to the surface waviness is that the surface waviness Wa be not more than 0.60 nm, and hence Examples 1 to 5 all satisfied the surface waviness product quality.

|  |  |  |
|---|---|---|
| Edge part shape (roll-off): | Example 1 | 0.10 μm |
|  | Example 2 | 0.18 μm |
|  | Example 3 | 0.18 μm |
|  | Example 4 | 0.19 μm |
|  | Example 5 | 0.10 μm |

The product quality required with regard to the edge part shape is that the roll-off be not more than 0.20 μm, and hence Examples 1 to 5 all satisfied the edge part shape product quality.

|  |  |  |
|---|---|---|
| Polishing time: | Example 1 | 59 min |
|  | Example 2 | 60 min |
|  | Example 3 | 63 min |
|  | Example 4 | 55 min |
|  | Example 5 | 64 min |

The maximum acceptable time for the precision polishing is approximately 70 min, and hence the polishing time was acceptable for all of Examples 1 to 5.

As described above, for all of Examples 1 to 5, all three types of product quality required of the glass substrate were satisfied, and moreover the polishing time was good from the perspective of production efficiency.

Moreover, from Table 1 it can be seen that, for the remaining Examples 6 to 9 as well, the required product quality was satisfied and the polishing time was good.

For Examples 10 to 16, the glass substrates were polished using the polishing method according to the second and third embodiments described above.

1. First polishing (the first polishing step) was carried out using the polishing apparatus shown in FIG. 2. A polishing slurry obtained by mixing cerium oxide abrasive grains of mean grain diameter approximately 1.5 μm with water was used in main polishing (the preceding polishing step). A polishing slurry obtained by mixing cerium oxide abrasive grains of mean grain diameter approximately 1.5 μm with water was used in subsequent polishing (the succeeding polishing step). The polishing pads used were hard pads (polyurethane pads made by Speedfam Co., Ltd.; product name MHC15A).

2. Second polishing (the second polishing step) was carried out using the polishing apparatus shown in FIG. 2. A polishing slurry obtained by mixing zirconium oxide abrasive grains of mean grain diameter approximately 0.5 μm with water was used. The polishing pads used were soft pads (suede pads made by Speedfam Co., Ltd.; product name Polytex).

Polishing Conditions During the Main Polishing (Preceding Polishing Step of the First Polishing Step) for Examples 10 to 12

|  |  |
|---|---|
| Polishing pressure P1: | 100 g/cm$^2$ |
| Rotational speed R1: | 40 rpm |
| Polishing amount: | 35 μm |
| Time T1: | 35 min |

Polishing Conditions During the Subsequent Polishing (Succeeding Polishing Step of the First Polishing Step) for Examples 10 to 12

|  |  |
|---|---|
| Polishing pressure P1: | 50 g/cm$^2$ |
| Rotational speed R1: | 40 rpm |
| Polishing amount: | 5 μm |
| Time T1: | 10 min |

Polishing Conditions During the Second Polishing for Examples 10 to 12

|  |  |  |
|---|---|---|
| Polishing pressure P1: | Example 10 | 40 g/cm$^2$ |
|  | Example 11 | 70 g/cm$^2$ |
|  | Example 12 | 30 g/cm$^2$ |
| Rotational speed R1: | Example 10 | 30 rpm |
|  | Example 11 | 50 rpm |
|  | Example 12 | 20 rpm |
| Polishing amount: | 4 μm (for all of Examples 10 to 12) | |
| Time T1: | Example 10 | 9 min |
|  | Example 11 | 6 min |
|  | Example 12 | 20 min |

As a result of carrying out polishing under the above polishing conditions, the following product qualities were obtained.

|  |  |  |
|---|---|---|
| Surface roughness Ra: | Example 10 | 0.34 nm |
|  | Example 11 | 0.36 nm |
|  | Example 12 | 0.32 nm |

Examples 10 to 12 all satisfied the surface roughness product quality.

| Surface waviness Wa: | Example 10 | 0.52 nm |
|---|---|---|
| | Example 11 | 0.59 nm |
| | Example 12 | 0.52 nm |

Examples 10 to 12 all satisfied the surface waviness product quality.

| Edge part shape (roll-off): | Example 10 | 0.15 μm |
|---|---|---|
| | Example 11 | 0.18 μm |
| | Example 12 | 0.14 μm |

Examples 10 to 12 all satisfied the edge part shape product quality.

| Polishing time: | Example 10 | 54 min |
|---|---|---|
| | Example 11 | 51 min |
| | Example 12 | 65 min |

The polishing time was acceptable for all of Examples 10 to 12.

As described above, for all of Examples 10 to 12, all three types of product quality required of the glass substrate were satisfied, and moreover the polishing time was good from the perspective of production efficiency.

Moreover, from Table 1 it can be seen that, for the remaining Examples 13 to 16 as well, the required product quality was satisfied and the polishing time was good.

For Examples 17 and 18, the glass substrates were polished using the polishing method according to the third embodiment described above.

1. First polishing (the first polishing step) was carried out using the polishing apparatus shown in FIG. 2. A polishing slurry obtained by mixing cerium oxide abrasive grains of mean grain diameter approximately 1.5 μm with water was used in main polishing (the preceding polishing step). A polishing slurry obtained by mixing cerium oxide abrasive grains of mean grain diameter approximately 1.5 μm with water was used in subsequent polishing (the succeeding polishing step). The polishing pads used were hard pads (polyurethane pads made by Speedfam Co., Ltd.; product name MHC15A).

2. Second polishing (the second polishing step) was carried out using the polishing apparatus shown in FIG. 2. A polishing slurry obtained by mixing abrasive grains of mean grain diameter approximately 0.2 μm with water was used in prior polishing (the preceding polishing step). As the abrasive grains, zirconium oxide abrasive grains were used in Example 17, and cerium oxide abrasive grains were used in Example 18. A polishing slurry obtained by mixing abrasive grains of mean grain diameter approximately 0.1 μm with water was used in main polishing (the succeeding polishing step). In Example 17, zirconium oxide abrasive grains were used, and in Example 18, cerium oxide abrasive grains were used. The polishing pads used were soft pads (suede pads made by Speedfam Co., Ltd.; product name Polytex).

Polishing Conditions During the Main Polishing of the First Polishing (Preceding Polishing Step of the First Polishing Step) for Examples 17 and 18

| Polishing pressure P1: | 100 g/cm² |
|---|---|
| Rotational speed R1: | 40 rpm |
| Polishing amount: | 35 μm |
| Time T1: | 35 min |

Polishing Conditions During the Subsequent Polishing of the First Polishing (Succeeding Polishing Step of the First Polishing Step) for Examples 17 and 18

| Polishing pressure P1: | 50 g/cm² |
|---|---|
| Rotational speed R1: | 40 rpm |
| Polishing amount: | 5 μm |
| Time T1: | 10 min |

Polishing Conditions During the Prior Polishing of the Second Polishing (the Preceding Polishing Step of the Second Polishing Step) for Examples 17 and 18

| Polishing pressure P1: | 80 g/cm² |
|---|---|
| Rotational speed R1: | 30 rpm |
| Polishing amount: | 7 μm |
| Time T1: | 10 min |

Polishing Conditions During the Subsequent Polishing of the Second Polishing (the Succeeding Polishing Step of the Second Polishing Step) for Examples 17 and 18

| Polishing pressure P1: | 40 g/cm² |
|---|---|
| Rotational speed R1: | 30 rpm |
| Polishing amount: | 4 μm |
| Time T1: | 9 min |

As a result of carrying out polishing under the above polishing conditions, the following product qualities were obtained.

| Surface roughness Ra: | Example 17 | 0.33 nm |
|---|---|---|
| | Example 18 | 0.32 nm |

Examples 17 and 18 both satisfied the surface roughness product quality.

| Surface waviness Wa: | Example 17 | 0.52 nm |
|---|---|---|
| | Example 18 | 0.51 nm |

Examples 17 and 18 both satisfied the surface waviness product quality.

| Edge part shape (roll-off): | Example 17 | 0.12 μm |
|---|---|---|
| | Example 18 | 0.10 μm |

Examples 17 and 18 both satisfied the edge part shape product quality.

| Polishing time: | Example 17 | 64 min |
|---|---|---|
| | Example 18 | 54 min |

The polishing time was acceptable for both of Examples 17 and 18.

As described above, for both of Examples 17 and 18, all three types of product quality required of the glass substrate were satisfied, and moreover the polishing time was good from the perspective of production efficiency.

As shown in Table 1, for each of the comparative examples 1 to 6, single-step polishing was carried out for both the first polishing and the second polishing in accordance with the conventional polishing method.

1. First polishing (the first polishing step) was carried out using the polishing apparatus shown in FIG. 2. A polishing slurry obtained by mixing cerium oxide abrasive grains of mean grain diameter approximately 1.5 μm with water was used. The polishing pads used were hard pads (polyurethane pads made by Speedfam Co., Ltd.; product name MHC15A).

2. Second polishing (the second polishing step) was carried out using the polishing apparatus shown in FIG. 2. A polishing slurry obtained by mixing cerium oxide abrasive grains of mean grain diameter approximately 0.5 μm with water was used. The polishing pads used were soft pads (suede pads made by Speedfam Co., Ltd.; product name Polytex).

As is learned from table 1, for Comparative Examples 1 and 3, the polishing time was very short and the required product quality with regard to the surface roughness was satisfied, but the required product qualities with regard to the surface waviness and the edge part shape were not satisfied.

For Comparative Examples 2, 4 and 5, the required product qualities with regard to the surface roughness, the surface waviness and the edge part shape were all satisfied, but the polishing time exceeded the maximum acceptable time.

For Comparative Example 6, only the required product quality with regard to the surface roughness was satisfied, and moreover the polishing time exceeded the maximum acceptable time.

What is claimed is:

1. A method of polishing a glass substrate for information recording media, comprising:
    a precision polishing step having a first polishing step and a second polishing step carried out in this order, in which, after carrying out rough polishing on major surfaces of a glass substrate, precision polishing is carried out on the major surfaces by feeding abrasive grains onto the major surfaces, pushing polishing members against the major surfaces, and rotating the major surfaces and the polishing members relative to one another;
    wherein at least one of said first polishing step and said second polishing step has a preceding polishing step and a succeeding polishing step carried out in this order, and a mean grain diameter of the abrasive grains in said succeeding polishing step is not more than in said preceding polishing step, and a pressure at which the polishing members are pushed against the major surfaces is lower in said succeeding polishing step than in said preceding polishing step.

2. A method of polishing a glass substrate for information recording media, comprising:
    a precision polishing step having a first polishing step and a second polishing step carried out in this order, in which, after carrying out rough polishing on major surfaces of a glass substrate, precision polishing is carried out on the major surfaces by feeding abrasive grains onto the major surfaces, pushing polishing members against the major surfaces, and rotating the major surfaces and the polishing members relative to one another;
    wherein said second polishing step has a preceding polishing step and a succeeding polishing step carried out in this order, and a mean grain diameter of the abrasive grains in said succeeding polishing step is not more than in said preceding polishing step, and a pressure at which the polishing members are pushed against the major surfaces is lower in said succeeding polishing step than in said preceding polishing step.

3. A method of polishing a glass substrate for information recording media as claimed in claim 2, wherein said succeeding polishing step has a plurality of steps each having a different combination of the mean grain diameter of the abrasive grains and the pressure at which the polishing members are pushed against the major surfaces.

4. A method of polishing a glass substrate for information recording media as claimed in claim 2, wherein the pressure at which the polishing members are pushed against the major surfaces is in a range of 80 to 200 g/cm$^2$ in said first polishing step, in a range of 80 to 150 g/cm$^2$ in said preceding polishing step, and in a range of 30 to 70 g/cm$^2$ in said succeeding polishing step.

5. A method of polishing a glass substrate for information recording media, comprising:
    a precision polishing step having a first polishing step and a second polishing step carried out in this order, in which, after carrying out rough polishing on major surfaces of a glass substrate, precision polishing is carried out on the major surfaces by feeding abrasive grains onto the major surfaces, pushing polishing members against the major surfaces, and rotating the major surfaces and the polishing members relative to one another;
    wherein said first polishing step has a preceding polishing step and a succeeding polishing step carried out in this order, and a mean grain diameter of the abrasive grains in said succeeding polishing step is not more than in said preceding polishing step, and a pressure at which the polishing members are pushed against the major surfaces is lower in said succeeding polishing step than in said preceding polishing step.

6. A method of polishing a glass substrate for information recording media as claimed in claim 5, wherein said succeeding polishing step has a plurality of steps each having a different combination of the mean grain diameter of the abrasive grains and the pressure at which the polishing members are pushed against the major surfaces.

7. A method of polishing a glass substrate for information recording media as claimed in claim 5, wherein the pressure at which the polishing members are pushed against the major surfaces is in a range of 90 to 200 g/cm$^2$ in said preceding polishing step, in a range of 30 to 80 g/cm$^2$ in said succeeding polishing step, and in a range of 30 to 80 g/cm$^2$ in said second polishing step.

8. A method of polishing a glass substrate for information recording media, comprising:
    a precision polishing step having a first polishing step and a second polishing step carried out in this order, in which, after carrying out rough polishing on major surfaces of a glass substrate, precision polishing is carried out on the major surfaces by feeding abrasive grains onto the major surfaces, pushing polishing members against the major surfaces, and rotating the major surfaces and the polishing members relative to one another;

wherein said first polishing step has a preceding polishing step and a succeeding polishing step carried out in this order, and a mean grain diameter of the abrasive grains in said succeeding polishing step is not more than in said preceding polishing step, and a pressure at which the polishing members are pushed against the major surfaces is lower in said succeeding polishing step than in said preceding polishing step; and wherein said second polishing step has a preceding polishing step and a succeeding polishing step carried out an this order, and a mean grain diameter of the abrasive grains in said succeeding polishing step of said second polishing step is not more than in said preceding polishing step of said second polishing step, and a pressure at which the polishing members are pushed against the major surfaces is lower in said succeeding polishing step of said second polishing step than in said preceding polishing step of said second polishing step.

9. A method of polishing a glass substrate for information recording media as claimed in claim 8, wherein said succeeding polishing step of said first polishing step has a plurality of steps each having a different combination of the mean grain diameter of the abrasive grains and the pressure at which the polishing members are pushed against the major surfaces, and said succeeding polishing step of said second polishing step has a plurality of steps each having a different combination of the mean grain diameter of the abrasive grains and the pressure at which the polishing members are pushed against the major surfaces.

10. A method of polishing a glass substrate for information recording media as claimed in claim 8, wherein the pressure at which the polishing members are pushed against the major surfaces is in a range of 90 to 200 g/cm² in said preceding polishing step of said first polishing step, in a range of 30 to 80 g/cm² in said succeeding polishing step of said first polishing step, in a range of 80 to 150 g/cm² in said preceding polishing step of said second polishing step, and in a range of 30 to 70 g/cm² in said succeeding polishing ste of said second polishing step.

11. A method of polishing a glass substrate for information recording media as claimed in any one of claims 1 through 10, wherein the polishing members are hard urethane pads in said first polishing step, and soft suede pads in said second polishing step.

12. A method of polishing a glass substrate for information recording media as claimed in any one of claims 1 through 10 wherein the abrasive grains in said first polishing step are cerium oxide abrasive grains having a mean grain diameter in a range of 1.1 to 1.5 µm, and the abrasive grains in said second polishing step are cerium oxide abrasive grains having a mean grain diameter of not more than 1 µm.

13. A method of polishing a glass substrate for information recording media as claimed in claim 11, wherein the abrasive grains in said first polishing step are cerium oxide abrasive grains having a mean grain diameter in a range of 1.1 to 1.5 µm, and the abrasive grains in said second polishing step are cerium oxide abrasive grains having a mean grain diameter of not more than 1 µm.

14. A method of polishing a glass substrate for information recording media as claimed in any one of claims 1 through 10, wherein a polishing amount of the glass substrate in said second polishing step is not less than 2 µm.

15. A method of polishing a glass substrate for information recording media as claimed in claim 11, wherein a polishing amount of the glass substrate in said second polishing step is not less than 3 µm.

16. A method of polishing a glass substrate for information recording media as claimed in any one of claims 1 through 10, wherein a polishing amount of the glass substrate in said first polishing step is not less than 30 µm.

17. A method of polishing a glass substrate for information recording media as claimed in claim 11, wherein a polishing amount of the glass substrate in said first polishing step is not less than 20 µm.

18. A method of polishing a glass substrate for information recording media as claimed in any one of claims 1 through 10, wherein a total polishing amount of the glass substrate through said first polishing step and said second polishing step is in a range of 33 to 100 µm.

19. A method of polishing a glass substrate for information recording media as claimed in claim 11, wherein a total polishing amount of the glass substrate through said first polishing step and said second polishing step is in a range of 33 to 100 µm.

* * * * *